O. O. TVETEN.
REVOLVING HARROW.
APPLICATION FILED JUNE 13, 1917.
1,253,307.
Patented Jan. 15, 1918.
2 SHEETS—SHEET 1.
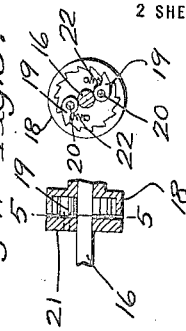
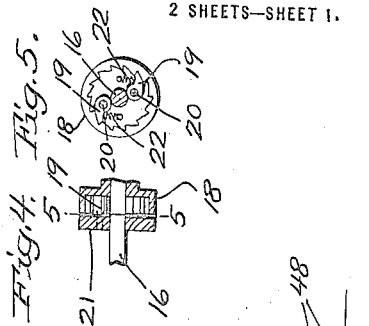
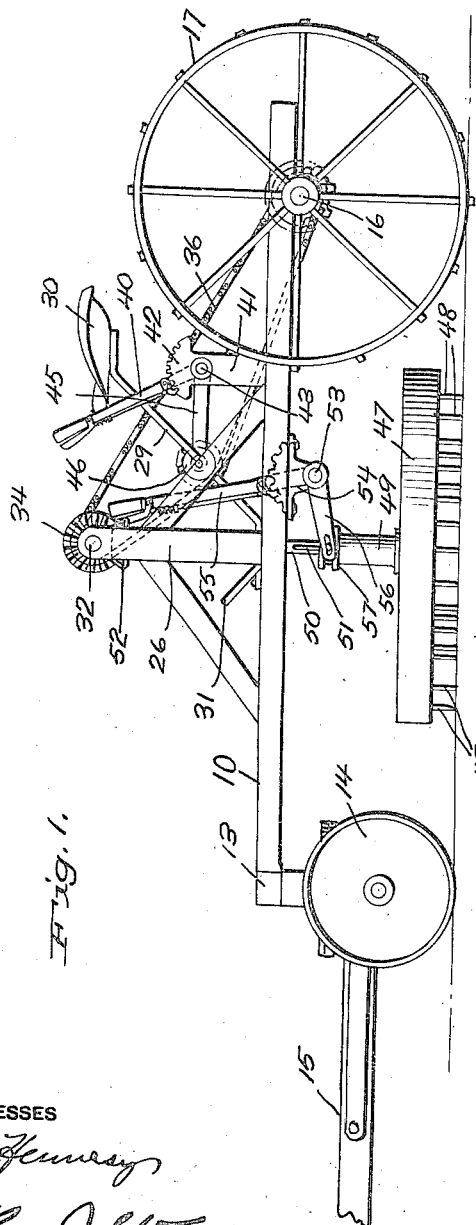
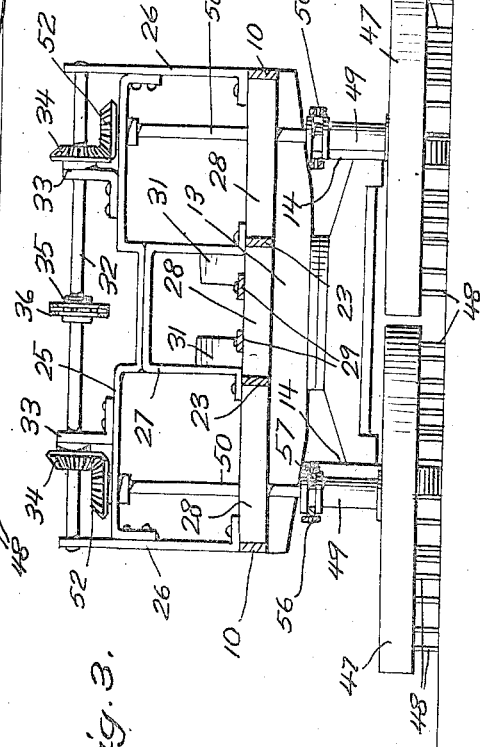
WITNESSES
INVENTOR
Olaus O. Tveten,
BY
ATTORNEY

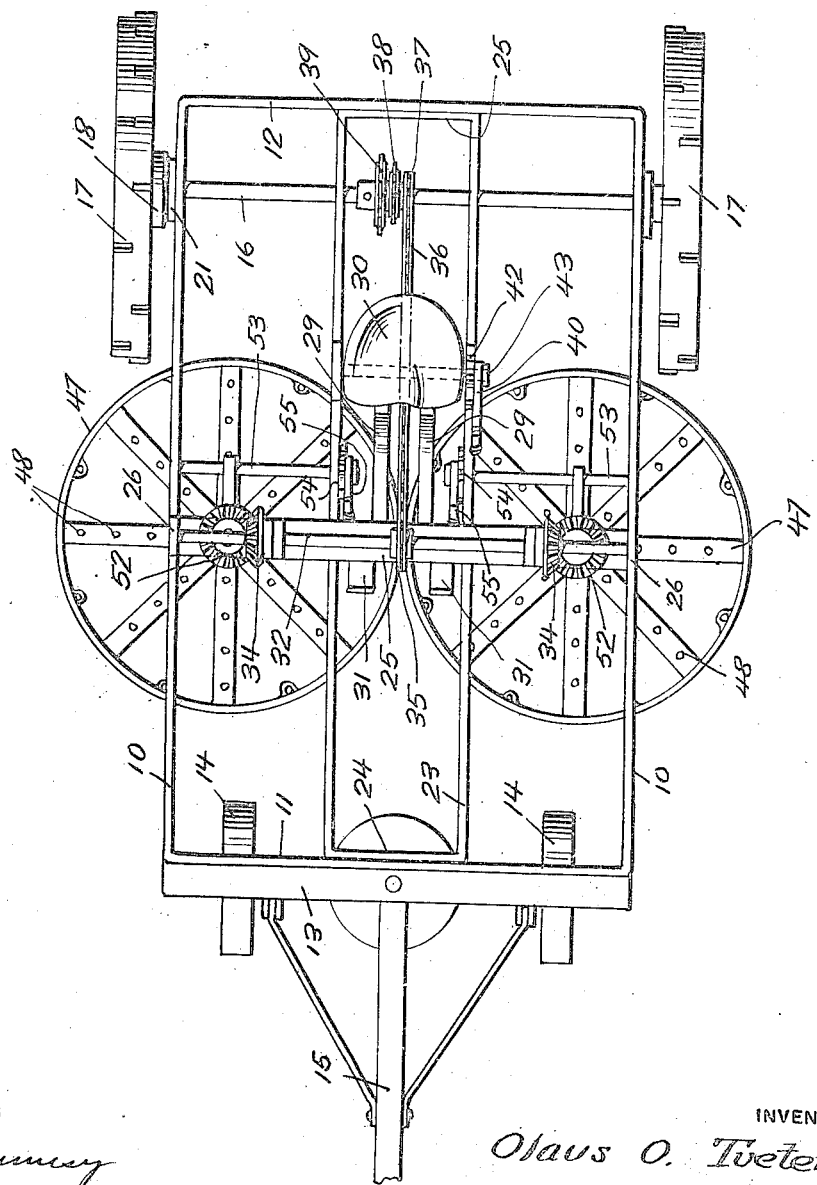

UNITED STATES PATENT OFFICE.

OLAUS O. TVETEN, OF GRAND FORKS, NORTH DAKOTA.

REVOLVING HARROW.

1,253,307.

Specification of Letters Patent.

Patented Jan. 15, 1918.

Application filed June 13, 1917. Serial No. 174,546.

*To all whom it may concern:*

Be it known that I, OLAUS O. TVETEN, a citizen of the United States, residing at Grand Forks, in the county of Grand Forks and State of North Dakota, have invented certain new and useful Improvements in Revolving Harrows, of which the following is a specification.

This invention relates to an improved harrow of the horizontally revolving wheel type and the principal object of the invention is to provide an improved means for mounting the two carrying wheels for rotary movement and for vertical adjustment and to further provide an improved frame construction for the harrow upon which the driver may ride and in which the driver's seat will be so located that easy access will be had to the levers controlling the revolving harrow.

Another object of the invention is to provide a frame which will be strongly braced and the harrowing means so mounted that the machine will be relieved of strain and prevented from injury.

Another object of the invention is to provide improved driving means for the revolving harrows, these means being so constructed that motion may be transmitted to the revolving harrows at different speeds.

This invention is illustrated in the accompanying drawings, wherein:—

Figure 1 is a view showing the improved harrow in side elevation,

Fig. 2 is a top plan view of the improved harrow,

Fig. 3 is a transverse sectional view through the improved harrow,

Fig. 4 is a sectional view through a pawl and ratchet clutch associated with one of the wheels of the harrow, and Fig. 5 is a sectional view taken along the line 5—5 of Fig. 4.

This harrow is provided with a frame having side bars 10 and end bars 11 and 12, a cross bar 13 being positioned in front of the frame and forming part of the forward truck with which are connected the forward supporting wheels and draft tongue 15. The rear axle 16 which constitutes a driving shaft is rotatably connected with the frame and carries supporting and driving wheels 17 one of which is provided with a hub extension forming an internally toothed ratchet 18 having its teeth engaged by the pawls 19 mounted upon pins 20 extending from the plate or collar 21 of the shaft 16. Springs 22 are connected with this plate 21 and engage the pawls to yieldably hold the pawls in engagement with the teeth of the ratchet 18. It will thus be seen that when the machine is drawn across the field, rotary movement will be transmitted to the axle or driving shaft 16. If in turning around, the wheels rotate rearwardly instead of forwardly, the pawls will slip past the teeth and the axle will remain stationary. It is of course understood that if desired, both wheels could be provided with the ratchet extensions and a pawl carrying collar placed at each end of the shaft if so desired.

Within the outer frame of this carriage, there is provided an inner frame, having side bars 23 and end bars 24 and 25, the end bars being connected with the end bars of the outer frame in any suitable manner.

A bridge 25 extends transversely above the inner and outer frames and has its end portions connected with the standards 26 and has its intermediate portion braced by the yoke 27. In order to brace the side bars of the inner and outer frame, there have been provided cross bars 28 the intermediate one of which carries the standards or arms 29 for the seat 30 and the foot support 31. The driven shaft 32 is rotatably mounted in bearings 33 and in the upper portions of the standards 26 and carries gears 34 and a sprocket wheel 35 about which passes a sprocket chain 36 passing about one of the sprocket wheels 37, 38 and 39 mounted upon the axle or driving shaft 16. It should be noted that the sprocket wheels 37, 38 and 39 are of different size and that therefore the rate of rotation of the shaft 32 with respect to the shaft 16 can be controlled by shifting the sprocket chain 36 from one sprocket wheel of shaft 16 to the other. In order to tighten, the sprocket chain after being moved from one sprocket wheel of the shaft to another, there has been provided a latch lever 40 pivotally mounted upon the bracket 41 at the upper end of which there is provided a rack 42. This latch lever is mounted upon a rocker shaft 43 rotatably mounted by the bracket 41 and the bracket 44 and carries an arm 45 extending forwardly and having at its free end a sprocket wheel 46 which engages the lower flight of the sprocket chain 36 and will draw the lower flight downwardly to tighten the chain when the latch lever is moved forwardly to the position shown in Fig. 1.

The drums or frames 47 which carry the harrow teeth 48 are rigidly mounted at the lower ends of the sleeves 49 which sleeves are keyed to the vertical shafts 50 as shown at 51 in Fig. 1. The shafts 50 carry gears 52 meshing with the gears 34 and when the machine is in operation, the drums 47 will be rotated thus causing the teeth to break up the lumps of dirt in a field. Rocker shafts 53 are mounted in bearings 54 beneath the carriage, the inner bearings providing racks for engagement by the latch levers 55 mounted upon the rocker shafts 53. These rocker shafts carry arms or forks 56 which forks engage the collars 57 at the upper ends of the sleeves 49 and when the latch levers are moved rearwardly from the position shown in Fig. 1, the rocker shafts will be rotated to swing the arms 56 upwardly thus raising the drums 47 out of engagement with the ground. It will therefore be seen that when turning at the end of the field, the harrow drums may be raised out of engagement with the ground and of course, it will also be seen that when traveling across a field, one or both of the drums may be raised to permit of passage over a rock or other obstruction in the field. This will further permit of the drums being raised when moving the machine from one field to another.

When in use, the machine will be driven to the field where it is to be used with the tooth carrying drums in a raised position and if desired with the sprocket chain disconnected from the sprocket wheels. When the field is reached, the sprocket chains will be put in place to connect the sprocket wheel 35 with a selected one of the sprocket wheels carried by the shaft 16 according to whether it is desired to have the drums rotate very rapidly or at a less rate of speed. The latch lever 40 will then be moved to bring the gear 46 into engagement with the lower flight of the chain and tighten the chain the desired amount. After the chain has been tightened, the latch levers 55 will be moved to lower the drums 47 and when lowered a sufficient amount to permit the teeth to dig into the ground the desired extent, the latches of these levers will be released and permitted to engage the rack 56 thus securely holding the drums at the desired point of adjustment. As the machine is driven across the field, rotary movement will be transmitted from the shaft 16 to the vertically extending shaft 50 and the drums will thus be rotated and the teeth carried thereby will cut the lumps of plowed earth into small particles.

It will thus be seen that there has been provided a very efficient harrow of the horizontally rotatable type.

What is claimed is:—

1. A harrow comprising a carriage including a rear axle constituting a driving shaft, supporting wheels mounted upon the rear axle and having connection with the rear axle for rotating the same, a driven shaft rotatably connected with said carriage, vertically extending supporting shafts rotatably connected with the carriage and driven from the driven shaft, tooth carrying drums having sleeves slidably mounted upon the vertically extending shafts, means for vertically adjusting the drums through engagement with the sleeves thereof, and releasably holding the drums in vertically adjusted positions, and means for transmitting rotary movement from the driving shaft to the driven shaft.

2. A harrow comprising a carriage, a rotatably mounted wheel supporting axle carried by the carriage and constituting a driving shaft, a bridge structure carried by the carriage, a driven shaft rotatably supported by the bridge structure, means for transmitting rotary movement from the driving shaft to the driven shaft, vertically extending shafts rotatably mounted and receiving rotary movement from the driven shaft, tooth carrying drums, sleeves extending from the tooth carrying drums and slidably fitting upon the vertically extending shafts, rotatably mounted rocker shafts, arms extending from the rocker shafts and connected with the sleeves, and levers connected with the rocker shafts for rotating the same and swinging the arms vertically to vertically adjust the drums and releasably hold the drums in vertically adjusted position.

3. A harrow comprising a carriage, standards connected with the carriage and extending above the same, a bridge connecting the standards above the carriage, a driven shaft rotatably supported by the standards, vertically extending shafts extending through the bridge, gears carried by the vertically extending shafts and driven shaft and engaging to transmit rotary movement of the driven shaft to the vertically extending shafts, tooth carrying drums slidably mounted upon the lower end portions of the vertically extending shafts, means for vertically adjusting the drums and releasably holding the drums in vertically adjusted positions, and means for transmitting rotary movement to the driven shaft.

4. A harrow comprising a carriage including an outer frame, an inner frame, standards connected with the side portions of the outer frame, a bridge connecting the standards, a support for the intermediate portion of the bridge connected with the inner frame, vertically extending shafts extending through the end portions of the bridge, a driven shaft carried by the standards, means for transmitting rotary movement from the the driven shaft to the vertically extending shafts, ground engaging elements having engagement with the lower portions of the vertically extending shafts and rotating the same, and means for transmitting rotary movement to the driven shaft.

5. A harrow comprising a carriage, a supporting structure carried by the carriage, a driven shaft rotatably connected with the supporting structure, a wheel supporting axle for the carriage constituting a driving shaft, a sprocket wheel mounted upon the driven shaft, a plurality of sprocket wheels mounted upon the driving shaft, a sprocket chain passing about the sprocket wheel of the driven shaft and a selected sprocket wheel of the driving shaft, a rotatably mounted rocker shaft, an arm extending from the rocker shaft and provided with a sprocket wheel for engagement with the sprocket chain, a lever connected with the rocker shaft for rotating the same and swinging the arm to bring the sprocket wheel carried thereby into and out of engagement with the sprocket chain, and movable earth working means having operative connection with the driven shaft.

6. A harrow comprising a carriage having an outer frame, an inner frame, a supporting structure carried by the inner and outer frames, a driven shaft carried by the supporting structure, vertically extending shafts having operative-connection with the driven shaft for rotation therefrom, tooth carrying drums having sleeves slidable upon the vertically extending shafts, rocker shafts rotatably mounted between the inner frame and the outer frame, arms extending from the rocker shafts and engaging the sleeves, levers connected with the rocker shafts for rotating the same and swinging the arms vertically to vertically adjust the drums and releasably hold the drums in vertically adjusted positions, and means for transmitting rotary movement to the driven shaft.

7. A harrow comprising a carriage having a wheel carrying axle constituting a driving shaft, a driven shaft, vertically extending shafts rotated from the driven shaft, earth working means connected with the vertically extending shafts and vertically adjustable thereon, and means for transmitting rotary movement from the driving shaft to the driven shaft.

In testimony whereof I affix my signature in presence of two witnesses.

OLAUS O. TVETEN.

Witnesses:
CHAS. S. GARVIN,
PEARL WENTZ.

Copies of this patent may be obtained for five cents each, by addressing the "Commissioner of Patents, Washington, D. C."